United States Patent [19]
Joel, Jr.

[11] 3,911,224
[45] Oct. 7, 1975

[54] SELECTOR TRAFFIC SURVEY ARRANGEMENT

[75] Inventor: Amos Edward Joel, Jr., South Orange, N.J.

[73] Assignee: Bell Telephone Laboratories, Incorporated, Murray Hill, N.J.

[22] Filed: Oct. 11, 1974

[21] Appl. No.: 514,014

[52] U.S. Cl. ...... 179/8 A; 179/18 AB; 179/175.2 C
[51] Int. Cl.² .......................................... H04Q 1/24
[58] Field of Search ......... 179/8 A, 18 AB, 175.2 C

[56] References Cited

UNITED STATES PATENTS 2,525,417 10/1950 Lomax ............................... 179/8 A
3,639,702 2/1972 Thompson .................. 179/175.2 C

*Primary Examiner*—Thomas W. Brown
*Attorney, Agent, or Firm*—D. E. Nester

[57] ABSTRACT

A traffic survey arrangement is disclosed for use in direct progression switching systems to detect overflows or "all-trunks-busy" conditions. More specifically, circuitry is provided on a common basis to a plurality of selectors to detect overflows and to determine the particular selector levels at which the overflows occurred. A level determination is made by timing the release of a selector and by decoding the release time in accordance with predetermined information specifying normal release times for each of the levels.

12 Claims, 2 Drawing Figures

SELECTOR TRAFFIC SURVEY ARRANGEMENT

FIELD OF THE INVENTION

This invention relates generally to communication system traffic survey circuits and, more particularly, to an arrangement for detecting the number of ineffectual attempts which are made in switching systems to seize idle circuits such as trunks, selectors, or connectors in various groups. Even more particularly, this invention relates to direct progression switching systems using gross motion switches and to ascertaining the particular level at which an overflow or all-trunks-busy condition is detected.

BACKGROUND OF THE INVENTION AND PRIOR ART

It is well known that in communication switching systems a separate transmission path does not exist between each and every telephone station. Instead, stations are arranged into groups, and the groups are interconnected by trunk, selector and connector circuits accessible to all the stations. In the usual situation, a number of such circuits associated with a particular destination are available to a number of stations, the number of stations being considerably in excess of the number of trunks. The precise number of circuits such as trunks that are necessary between a group of stations and a certain destination is statistically determined from traffic surveys. It follows that the accuracy of the collected statistical data is a critical factor in the determination of the quality, the accessibility, and the economics of any communication switching system.

One arrangement for obtaining statistical data corresponding to the usage of the trunks in a particular trunk group is to count the number of times an attempt to complete a connection over the trunks fails because all of the trunks in the group are busy. This is known as an overflow or all-trunks-busy situation. In common control systems, such as crossbar systems, such a "peg count" is obtained in a straightforward manner by monitoring an "all-trunks-busy" relay in the marker.

However, in direct progression switching systems such as step-by-step (S × S) systems, the problem becomes more difficult since a central record cannot be maintained because each selector hunts individually over a subgroup of ten terminals searching for a trunk or other circuit that is idle. In such a system when a trunk is busy, a ground is connected via the trunk sleeve lead to the bank position in each selector associated with that trunk. The ground on the selector bank terminals causes any stepping magnet of a "hunting" selector to advance to the next terminal. Thus, ground potential on all ten terminals of a selector switch level causes a hunting selector to step to the 11th position. In the 11th position, the selector returns a busy or "overflow" signal to the calling station and returns to its idle position when the calling station goes on-hook. In returning, the selector first rotates over the ten preceding bank terminals and then falls to its normal idle position. Thus, in direct progression systems in order to obtain a peg count of the number of ineffectual attempts to connect to a group of trunks, it is necessary to determine how often the associated selectors advance to their respective 11th rotary positions.

One obvious answer to this problem is to individually monitor the 11th position of each selector and count the number of times each selector advances to that position. Such an approach becomes prohibitively expensive since each trunk is multiplied to a number of selectors all of which would have to be physically modified to provide the indication desired.

In the past, circuit arrangements such as T. L. Dimond U.S. Pat. No. 2,378,541, issued June 19, 1945, have been devised to determine the busy-idle status of a trunk circuit. In Dimond, provision is made to use the winding of a test relay connected into a trunk sleeve lead to determine whether that trunk is currently busy. Since the trunk sleeve leads in a direct progressive switching system are extremely sensitive, the introduction therein of a relay winding is impractical. In addition, since in Dimond the only output is a busy-idle indication of each trunk, no provision is available to provide a count of the number of ineffectual attempts which are made to seize the busy trunks.

The prior art systems which do provide such a count, such as H. Hovland U.S. Pat. No. 2,216,532, issued Oct. 1, 1940, use pen registers to record attempts to seize trunks. As taught by Hovland, the registers provide trunk identification as well as indications as to whether the trunk was busy when called. The pen registers of the Hovland system are driven from pulse information supplied by the S × S system and the marks produced by the pens are then interpreted visually by operators.

In addition to being mechanically awkward, the Hovland register is extremely uneconomical to use, since trained personnel must be employed to read and interpret the data provided by pen registers.

In still another prior art system as described in H. K. Thompson U.S. Pat. No. 3,639,702, issued Feb. 1, 1972, detectors are inserted into the path between the hunting switch stepping relay of each selector level to be studied and the sleeve leads of the 9th (next to last) and 10th (last) trunks. Isolation circuits are required between the stages in such a manner as to prevent the registration of a peg count based upon the rotations of switches in a switching stage other than the stage in which the overflow study was being conducted. These isolation circuits are physically difficult to insert and may make the arrangement prohibitively expensive because of the large number of such circuits which are required.

Accordingly a need exists in the art for an economical and easily implemented arrangement for monitoring overflows in selector switches and for obtaining statistically reliable data pertaining to the number of overflows and specifically to the level at which the overflow occurred.

It is an object of this invention to provide overflow circuitry easily implemented in existing S × S switches for counting overflows and for indicating the level or trunk group at which the overflow occurred.

SUMMARY OF THE INVENTION

In accordance with the principles of my invention, traffic survey circuitry is provided on a common basis to a plurality of selectors to detect overflows and to indicate the levels at which the overflows occur. To elaborate, when a wiper of a selector hunts over the ten terminals at a level and finds all terminals busy, the selector assumes the 11th rotary terminal position and applies on all-trunks-busy tone to the subscriber's loop for application to the calling station. When the station goes on-hook responsive to the applied tone, a release magnet operates to release the selector so that it can assume its normal idle position. Upon completion of its rotary return motion, the selector falls from the level at which it was hunting to its normal down position. The selector requires a different amount of time to fall from each of the levels. By timing the amount of time it takes a selector to fall, the level from which it fell can be ascertained. This level in turn indicates the particular group of trunks which were found busy.

More specifically, in accordance with this one illustrative embodiment of my invention, circuitry is provided for generating a first signal when the wiper of a selector enters or leaves an 11th rotary terminal position indicative of an overflow, and for generating a second signal when the release magnet is energized which causes the selector to return to its normal idle position. Jointly responsive to the first and second signals, a timer is enabled to time the release time of the selector. When the release magnet is deenergized, the timer is disabled so that the instant count therein specifies the release time of the selector. This release time is then decoded based upon predetermined information specifying normal anticipated release times at each of the levels and, accordingly, the level at which the overflow occurred is determined. A counter associated with the indicated level is then incremented to store the number of overflows which occurred at this level.

In accordance with a feature of my invention, the time it takes a selector to release from a terminal position indicating an overflow is monitored to derive from such time the vertical level at which the overflow occurred.

In accordance with an aspect of my invention, traffic survey information for a plurality of selectors is derived by monitoring only two leads common to the plurality of selectors. Accordingly, further physical modification of the selectors is not required.

In accordance with another aspect of my invention, an indication that a selector is releasing from an overflow position is generated jointly responsive to bunching of cam spring contacts associated with the eleventh rotary terminal positions and to the energization of the release magnet. Because this bunching lasts only momentarily, it is possible for my circuitry to monitor a plurality of selectors while avoiding the problem of timing the release time of any selector once one selector reached an eleventh rotary terminal position.

BRIEF DESCRIPTION OF THE DRAWING

The foregoing as well as other objects, features, and advantages of my invention, will be more apparent from a description of the drawing in which.

INTRODUCTION

The apparatus used to establish connections in an S × S office is called the "switch" train and comprises three types of stepping switches. The first type is called a "linefinder" and serves to detect service requests on subscriber lines and to connect a line requiring service (i.e., calling line) to the second type of switch known as a selector. An office may contain various stages of selectors depending upon the size of the office. The last type of switch is called a connector and serves as the final selection stage to connect the calling line to the called line, if it is idle.

Figure 1:
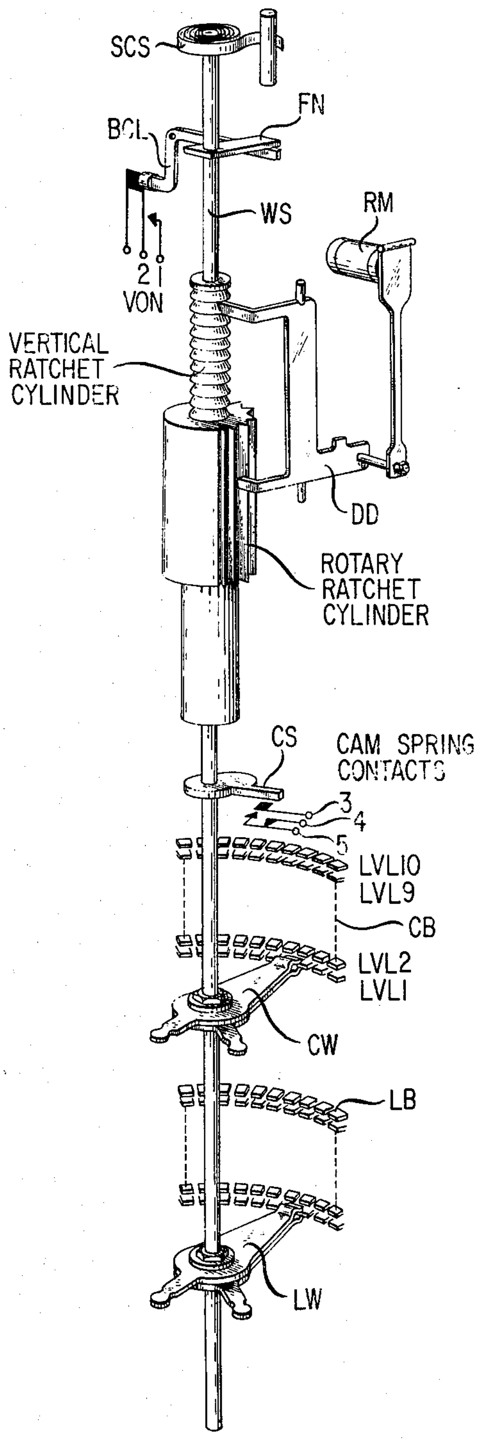
FIG. 1 illustrates well-known mechanical apparatus in an S × S selector.

The basic switch used in S × S systems is a two-motion stepping switch as partially depicted in FIG. 1. This switch is composed of a wiper shaft (WS) which is first raised vertically by electromechanical apparatus (not shown) which operates in conjunction with the depicted vertical ratchet cylinder. As the shaft begins to move vertically, finger FN affixed thereto permits the end of bell crank lever BCL touching the finger to rise, thereby causing vertical-off-normal contacts 1–2 to close. After being raised vertically to the proper level, shaft WS is rotated horizontally by other electromechanical apparatus (not shown) which interacts with the depicted rotary ratchet cylinder. Control wiper CW and line wiper LW serve to respectively make contact with terminals in control bank CB and terminals in line bank LB. These wipers move up to the various levels as the shaft is moved vertically and then move in a rotary clockwise motion across the terminals as the shaft is rotated.

The selector switches are directly actuated by subscriber generated dial pulses to move the shaft vertically and then automatically hunt in a rotary motion for an idle trunk for a path to the next selector (or other S × S equipment). More specifically, wiper shaft WS is first raised vertically under the direct control of the pulses in a dialed digit thereby selecting a trunk level or group of ten trunks. For example, responsive to the digit 2 (which comprises two dial pulses), the wiper shaft would move up vertically two positions so that the control wiper would be even with level two terminals LVL2 of the control bank. If the digit 9 had been dialed, the shaft would have moved up nine positions and, accordingly, the control wiper would have moved up vertically to terminals LVL9.

Following the above-described vertical motion, the wiper shaft automatically moves in a clockwise rotary motion to select an idle path to the next selector switch. The selector first tests the trunks (i.e., trunk sleeve leads in control bank CB) associated with the leftmost terminals and stops the rotary motion at the first idle trunk. A busy trunk is indicated by the application of a ground potential to the terminal associated thereof. If all ten trunks in the selected vertical level are busy, the control wiper will then move the 11th terminal position for which no terminal is generally provided. As the wiper enters the 11th terminal position, cam shaft CS, which is affixed to wiper shaft WS, makes contact with cam spring contacts 3, 4, and 5. Contacts 3–5 momentarily bunch together so that all three contacts touch and then contacts 3 and 5 make and 4 and 5 break. An audible overflow or all-trunks-busy tone is then returned to the calling station. When the calling station goes on-hook, release magnet RM is energized. The armature of magnet RM is pivoted at its upper end and presses against double dog DD and removes dog DD from engagement with the vertical and rotary cylinders. The shaft then begins to return to its normal idle position. More specifically, under the force applied by spring SCS, the control wiper first moves in a counterclockwise rotary motion leaving the 11th rotary terminal position. Contacts 3, 4, and 5 again momentarily bunch and then assume their unoperated position. The control wiper then passes over the ten terminals and then the wiper shaft falls under the acceleration of gravity to its normal down position. Just prior to reaching the rest or down position of the shaft, finger FN strikes lever BCL causing VON contacts 1–2 to break.

For further detailed explanation of the operation of S × S switches, the following literature may be consulted: *Telephone Theory and Practice* by K. B. Miller, published by McGraw-Hill Book Co. in 1933; and *Basic Telephone Switching Systems* by David Talley, published by Hayden Book Company, Inc. in 1969.

DESCRIPTION

When a selector releases, it takes an average of 0.042 seconds to retrace the rotary path in a level over the 10 sets of contacts serving the trunks or interstage links that were found busy. This rotary return motion takes about the same time irrespective of the specific level at which the release is made.

When the rotary motion is completed, the wiper shaft drops under the acceleration of gravity. It takes an average of 0.104 seconds for the wiper shaft to completely drop from the 10th level. This drop is approximately 1.25 inches. Using the familiar formula for a body falling under gravity where $d$ is the distance covered, assuming friction, $f$:

$$d = 16t^2 - f$$

Here, $d = 1.25/\mathbf{12}(\text{ft.})$ and $t = 0.104$ seconds, accordingly $f = 0.06889$. Using this $f$ as a constant, then the vertical release time from each level is as follows:

$$t = \sqrt{\frac{d+f}{16}}$$

and the total release time is equal in tenths of milliseconds to $(t+0.042)\times 10^4$.

| Level | Vertical Release Time (Sec.) | Total Release Time (t+0.042)×10⁴ | Range |
|---|---|---|---|
| 1 | 0.0704 | 1124 | 1100–1146 |
| 2 | 0.0749 | 1169 | 1147–1190 |
| 3 | 0.0791 | 1211 | 1191–1231 |
| 4 | 0.0831 | 1251 | 1232–1271 |
| 5 | 0.0870 | 1290 | 1272–1308 |
| 6 | 0.0906 | 1326 | 1309–1344 |
| 7 | 0.0941 | 1361 | 1345–1378 |
| 8 | 0.0975 | 1395 | 1379–1412 |
| 9 | 0.1008 | 1428 | 1413–1444 |
| 10 | 0.1040 | 1460 | 1445–1480 |

Since there may be a wide distribution of vertical release times for various selectors, particularly, since the selectors are not all adjusted identically and as well lubricated, the above table also includes a time range associated with a fall from each of the levels. Thus, for example, if the release time is between 1100 and 1146 $\mathbf{10}^{-4}$sec, then the selector has been released from the first level.

Since the release of a selector takes a normal maximum of 1480 $10^{-4}$sec, this period is very short and it is unlikely to overlap the release time of another selector. Accordingly as hereinafter described, my release timing circuitry can detect and record overflows for a group of selectors. It is contemplated that my overflow circuitry will serve a shelf of between 10 and 20 selectors.

DETAILED DESCRIPTION

Figure 2:
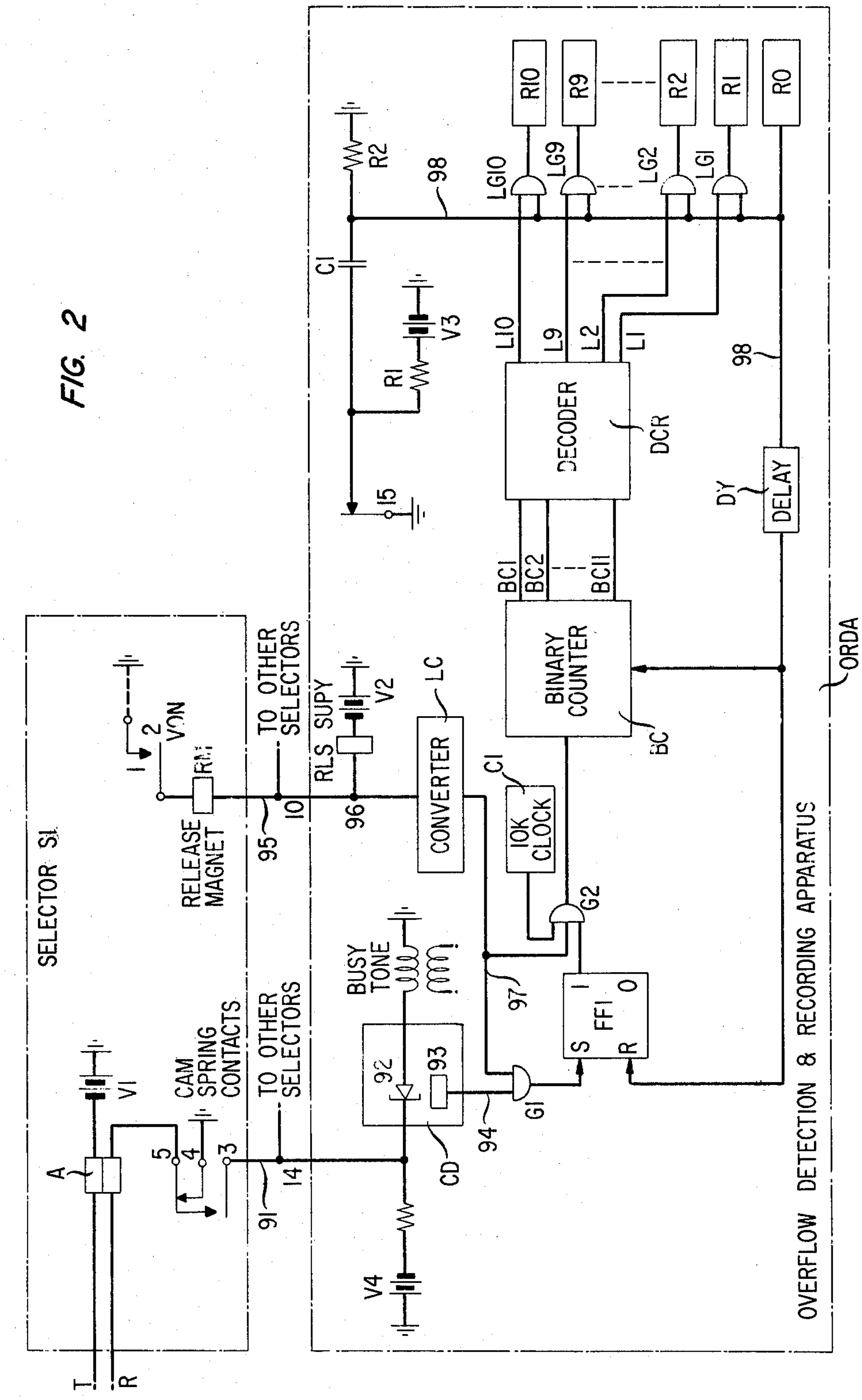
FIG. 2 illustrates pertinent circuitry in a selector, and the overflow detection and recording apparatus which operates in accordance with the principles of my invention.

Turning now to FIG. 2, some of the pertinent, well-known circuitry of selector S1 is illustrated, as well as the overflow detection and recording apparatus ODRA which constitutes one illustrative embodiment of my invention.

When a selector such as S1 is seized, the tip (T) and ring (R) leads, which form the talking path of the calling subscriber line, are connected to selector S1. Relay A now operates over the calling party loop circuit through the normally closed contacts of the F relay which is not illustrated. As the subscriber dials a digit, relay A releases during each open period of the dial contacts. Each successive dial pulse causes the reoperation of a vertical magnet (not shown) which raises the wiper shaft to the next vertical level. Thus, dialing the digit 9 causes the wiper shaft to be elevated to the 9th vertical level and mechanically operates vertically off-normal springs causing VON contacts 1–2 to make. Upon completion of dial pulse reception, relay A remains operated over the subscriber loop. The rotary magnet (not shown) then automatically operates to rotate the wiper shaft and its wipers clockwise to the first set of bank terminals on the previously selected 9th vertical level. If the trunk associated with the first contact on the 9th level of the control bank is idle, as evidenced by the lack of a ground potential on the associated terminal, then the call will be completed through the associated tip and ring terminals on the line bank. The wiper shaft then remains in this position until the call is completed.

However, if each of the 10 trunks on the 9th vertical level test busy (i.e., appears busy), the wiper shaft under the control of the rotary magnet rotates to the 11th terminal position. This constitutes an overflow condition which must be detected.

Current detector CD comprises light-emitting diode 92 and associated well-known transistor light detector circuitry 93. Normally, current flows through diode 92 under the potential applied by voltage source V4. Diode 92 emits light which is detected by detector circuitry 93 which applies a LOW potential over lead 94. However, as the control wiper enters or leaves an 11th terminal position, cam spring contacts 3, 4, and 5 momentarily bunch together and, accordingly, the ground associated with cam spring contact 4 is momentarily applied over lead 91. This causes the current flowing through diode 92 to momentarily cease flowing. Detector 93 fails to detect light during this brief interval and applies a HIGH signal over lead 94. However, gate G1 does not generate a HIGH output as the wiper enters the 11th terminal position because lead 97 is LOW at this time; but, as described hereinafter, gate G1 does generate a HIGH signal after release magnet RM is energized (lead 97 is HIGH) and when the cam springs again momentarily bunch as the wiper leaves the 11th terminal position.

When the wiper shaft completely rotates into the 11th terminal position, cam spring contacts 3–5 make and 4–5 break replacing the previous direct ground connection to the winding of relay A with the ground applied over lead 91. Current again flows through diode 92 and detector 93 generates a LOW output. An all-trunks-busy tone is applied over lead 91 through diode 92 and relay A to the calling station to advise the calling subscriber that the call could not presently be completed. Terminal 14 is multipled to the cam spring contacts of other selectors and detector CD also beneficially detects when each of these other selectors enter or leave an 11th terminal position.

When the calling station goes on-hook, relay A releases. Vertical-off-normal (VON) contacts 1–2 are closed and apply ground to release magnet RM via contacts of the A and B relay (not shown). Current then flows from potential V2 through relay RLS SUPY over lead 95 through release magnet RM and VON contacts 1–2 to ground. Magnet RM then begins to operate and disengages dog DD from the vertical and rotary cylinders. The shaft then begins to release. Lead 95 is also multipled to the release magnets in the other selectors. Voltage converter LC detects the application of ground via contacts VON 1–2 since the voltage at terminal 96 goes from the V2 to a more positive potential (i.e., toward ground potential). Responsive to this change, voltage converter LC generates a HIGH output signal over lead 97. As the selector wipers leave the 11th rotary step, cam spring contacts 3, 4, and 5 once again bunch, momentarily extinguishing the light-emitting diode and causing lead 94 to again go HIGH. Jointly responsive to the HIGH signals on leads 94 and 97, gate G1 then applies a HIGH output signal and thereby sets flip-flop FF1 to indicate that a selector having reached an overflow condition has now begun to release.

Thus in accordance with an aspect of my invention, an overflow indication is generated jointly responsive to the bunching of the cam spring contacts and to the energization of the release magnet.

Clock C1 supplies a repetitive 10K square wave to gate G2. The HIGH output of flip-flop FF1, and the HIGH output from converter LC energize gate G2 so that the gate supplies the square wave to binary counter BC. This counter comprises 11 stages and serves to count in tenths of milliseconds the time it takes a selector to return to its idle position from the 11th terminal position of a particular level.

Just prior to reaching its normal idle position, wiper shaft WS releases VON springs 1–2 as described previously to break the operating path of release magnet RM by removing ground potential therefrom.

When terminal 96 assumes potential V2, voltage converter LC applies a LOW signal over lead 97. This inhibits the further gating of clock signals by gate G2, and the binary count present in binary counter BC is no longer incremented. The present count is counter BC, which indicates the release time of the selector, is applied as a binary word over output leads BC1–BC11 to decoder DCR. Responsive to this count, the decoder generates a HIGH signal on one of its output leads L1-L10, which respectively correspond to the ten selector levels.

Decoder DCR operates in accordance with the range of times discussed in regard to the preceding table. Because the selector in this example fell from the 9th level, the wiper required about $1428\times10^{-4}$sec to return to its idle position and binary counter BC contains a count of about 1428 (i.e., from 1413 to 1444). Accordingly, the decoder generates a HIGH signal over lead L9, indicating the overflow occurred at the 9th level.

Release magnet RM and relay RLS SUPY require approximately 200 ms to return to their normal unoperated position. Thus after 200 ms, contact 15 associated with relay RLS SUPY closes. A HIGH going pulse of short duration generated by the RC circuit comprising resistor R1, capacitor C1 and voltage source V3, is then passed over lead 98 to gates LG1-LG10. This pulse is also applied over lead 98 to delay element DY. The HIGH signal on lead L9 and the HIGH pulse received over lead 98 cause gate LG9 to generate a HIGH output which increments the present count in register R9. This register serves to count overflows occurring at the 9th level of each of the plurality of selectors which have monitored by apparatus ODRA. Registers R1-R10 serve to respectively count the number of overflows occurring at levels 1-10. Register R0 is incremented each time an overflow is detected and serves to count the total number of overflows. Thus the HIGH signal on lead 98 also increments register R0. It is contemplated in this preferred embodiment that registers R0-R10 may be mechanical counters which can be photographed at specific time intervals, such as every 15 minutes, to detect those overflows associated with the heaviest selector traffic loads.

After a delay generated by delay element DY, the HIGH signal on lead 98 is applied to flip-flop FF1 to reset the flip-flop and is also applied to binary counter BC to reinitialize the counter to an all 0s state so that the counter can count the release timing pulses associated with timing the release of another selector.

Thus, in summary, overflow detection apparatus is provided on a common basis to a plurality of selectors and operates to time the release of those selectors whose control wipers assume the 11th rotary position indicating an overflow. This timing is instituted to ascertain the particular level at which the overflow condition occurred.

It is anticipated that other current detectors such as SCRs can be utilized in other embodiments in place of the various relays and detectors which are utilized in this one illustrative embodiment of my invention. It is also contemplated that various other relays and contacts in the selector can be monitored to obtain similar selector release timing information.

What is claimed is:

1. The method of detecting an overflow in a step-by-step selector and of indicating the level at which the overflow occurred, comprising the steps of providing a first signal when a wiper of the selector leaves a rotary position indicative of an overflow, providing a second signal when said wiper assumes an idle, down position, timing the amount of time between the provision of said first and second signals, the indicating the level at which the overflow occurred based upon said timed amount of time.

2. The method of detecting an overflow in a step-by-step selector and of indicating the level at which the overflow occurred, said selector including a control wiper and a release magnet energizable to return said control wiper to an idle position, said method comprising the steps of providing a first signal when said release magnet is energized, providing a second signal when said control wiper leaves an 11th rotary terminal position, jointly responsive to said first and second signals, enabling a timer to start timing the release time of said control wiper, disabling said timer when said release magnet is de-energized to terminate timing of said release time, and indicating the level at which the overflow occurred based upon said release time of said control wiper.

3. The method of detecting an overflow in a step-by-step switch and of indicating the vertical level at which the overflow occurred, said switch including a control wiper for assuming a plurality of vertical levels each associated with a group of communication paths and for assuming a plurality of rotary terminal positions associated with ones of said paths, said switch further including release means energizable to return said control wiper to an idle, unoperated position; said method comprising the steps of providing a first signal when said control wiper enters and when said control wiper leaves a rotary terminal position indicative that each said communication path in a group of said communication paths appeared busy, providing a second signal when said release means is energized, enabling a timer to time the release time of said control wipers jointly responsive to said first and second signals, disabling said timer when said release means is deenergized, and indicating the level at which the overflow occurred based upon said release time.

4. In combination for use with a selector having a wiper, a release magnet, and comprising contacts, first means for detecting when the wiper of a selector begins to release from an 11th rotary terminal position, second means for detecting when the wiper assumes an idle, unoperated state, means responsive to said first and second detecting means for timing the release time of the wiper, and means for indicating the level from which the wiper released based upon said release time.

5. The combination according to claim 4 wherein said indicating means indicates said level in accordance with predetermined expected release times for each of the possible levels.

6. The combination according to claim 4 wherein said detecting means comprises means responsive to the operation of a release magnet utilized to release the wiper, and means responsive to the operation of cam spring contacts associated with said 11th rotary terminal position.

7. For use with a step-by-step switching system including a selector; release means operable to return the wipers of the selector to an unoperated, down position; and cam spring contacts which bunch when the wipers enter or leave an 11th rotary terminal position;

apparatus for indicating that the wipers are releasing from an 11th rotary terminal position comprising means for providing a first signal each time said cam spring contacts bunch, means for providing a second signal when said release means operates, and means jointly responsive to said first and second signals for providing a third signal thereby indicating that the wipers are releasing from an 11th rotary terminal position.

8. The apparatus according to claim 7 wherein said third signal providing means comprises a gate.

9. The apparatus according to claim 7 for also indicating the level at which the wiper left the 11th rotary terminal position further comprising a timer for timing and indicating intervals of time, said second signal providing means also providing a fourth signal when the wipers assume the unoperated, down position, means for causing said timer to begin timing responsive to said third signal and to terminate timing responsive to said fourth signal, and level indicating means responsive to the time interval indicated by said timer for indicating the level at which the wipers left an 11th rotary terminal position.

10. The apparatus according to claim 9 wherein said level indicating means comprises a decoder for decoding said indicated timer interval in accordance with predetermined time intervals for each of the possible levels.

11. For use with a plurality of selectors each having a lead connected to a first lead extending to a common all-trunks busy tone generator and each having a lead connected to a second lead extending to a common release means power supply, apparatus for detecting overflows in each of said selectors and for indicating the level at which each overflow occurred comprising first detection means for connection to said first lead for providing a first signal each time one of said selectors leaves an 11th rotary terminal position, second detection means for connection to said second lead for providing a second signal each time a release relay in said one selector operates to release said one selector, a timer, means jointly responsive to said first and second signals for enabling said timer to begin timing the amount of time utilized by said one selector to release, said second detection means also providing a third signal when said release relay in said one selector terminates operation, said timer being responsive to said third signal for terminating timing, and level indicating means responsive to said release time timed by said timer for indicating the level at which said one selector released.

12. For use with a selector having a first lead extending from a cam spring contact to a source of all-trunks-busy tone; and having a second lead extending from release means, energizable to release said selector, to a release means power source; apparatus for detecting overflows and for indicating the level at which the overflow occurred comprising first detection means for connection to said first lead for detecting the momentary application of ground potential to said first lead indicating that said selector is entering or leaving an 11th rotary terminal position, second detection means for connection to said second lead for detecting the energization and deenergization of said release means, first gating means responsive to said first and second detection means for indicating when said selector leaves an 11th rotary terminal position, a source of repetitive timing signals, a binary counter, second gating means responsive to said indication from said first gating means, said second detection means, and said timing signals for applying said timing signals to said binary counter, said binary counter counting the number of said timing signals applied thereto to time the amount of time utilized by said selector to release, and decoding means for decoding said count in said binary counter in accordance with predetermined release times for each of the possible levels to indicate the level at which the overflow occurred.

* * * * *